No. 882,105. PATENTED MAR. 17, 1908.
R. FIRTH.
VEHICLE BRAKE MECHANISM.
APPLICATION FILED OCT. 10, 1907.
2 SHEETS—SHEET 1.
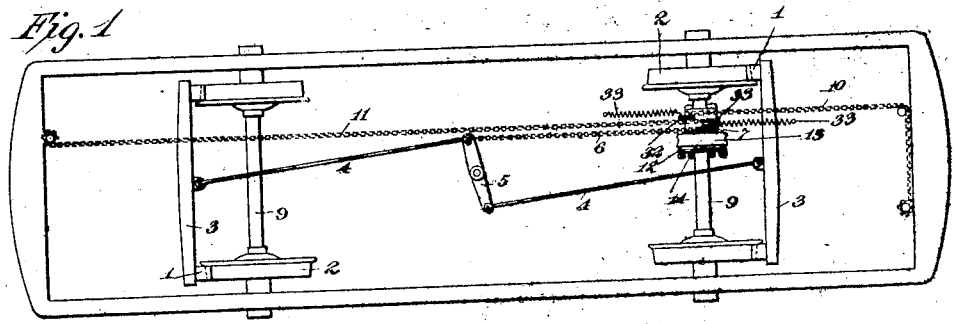
Fig. 1
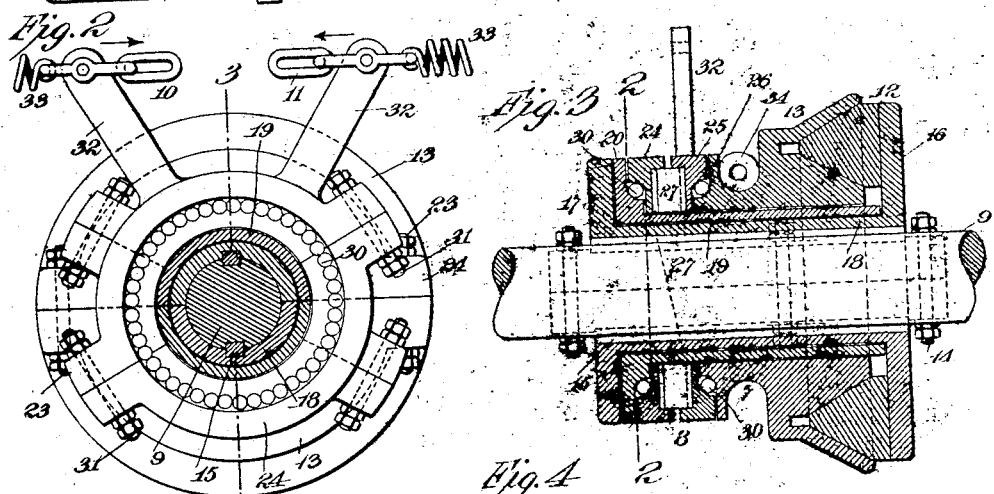
Fig. 2
Fig. 3
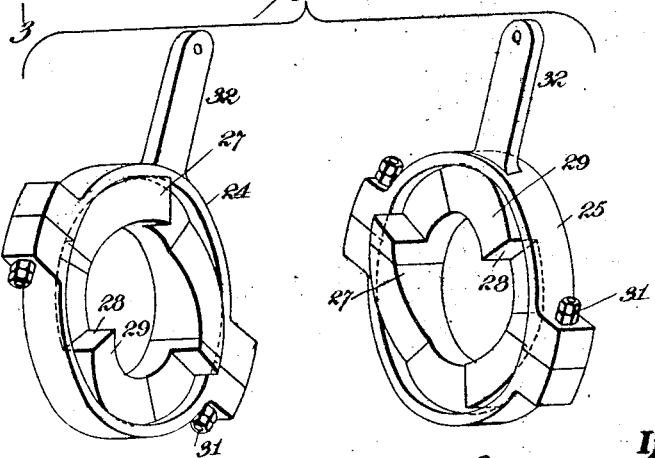
Fig. 4
Witnesses:
Jas. F. Coleman
Inventor
Rowland Firth
By Dyer and Dyer
Attorneys.

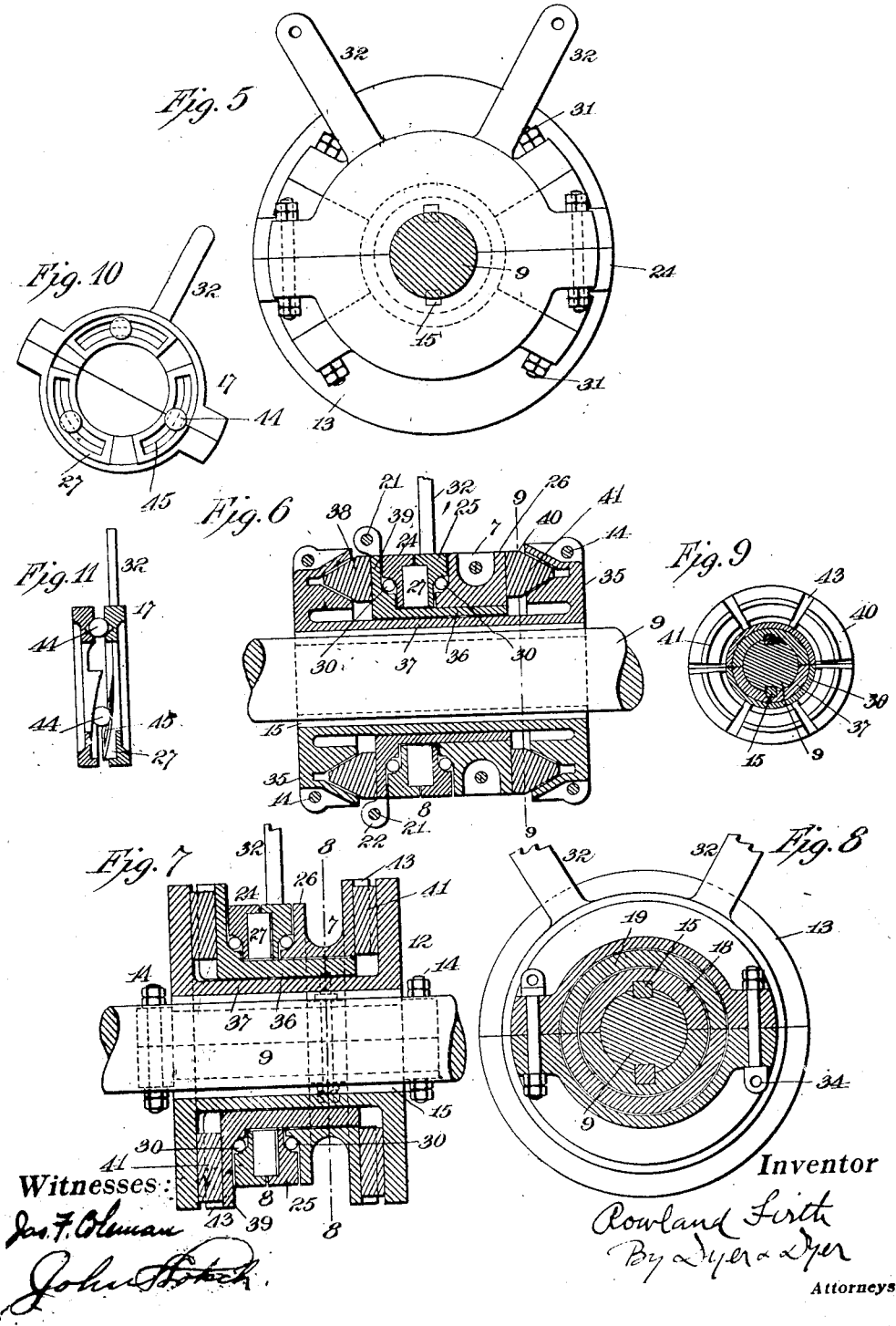

sole
UNITED STATES PATENT OFFICE.

ROWLAND FIRTH, OF PHILLIPSBURG, NEW JERSEY, ASSIGNOR TO ROWLAND FIRTH & SON, OF PHILLIPSBURG, NEW JERSEY, A COPARTNERSHIP.

VEHICLE BRAKE MECHANISM.

No. 882,105.   Specification of Letters Patent.   Patented March 17, 1908.

Application filed October 10, 1907.  Serial No. 396,789.

*To all whom it may concern:*

Be it known that I, ROWLAND FIRTH, a citizen of the United States, and a resident of the city of Phillipsburg, county of Warren, and State of New Jersey, have invented an Improvement in Vehicle Brake Mechanism, of which the following is a specification.

The object I have in view is the improvement of that type of vehicle brake mechanism which derives its power from the momentum of the vehicle, one embodiment of such type of brake mechanism being in a form in which the brake shoes are applied to the wheels by means of a flexible connecting member which is wound upon a drum caused to rotate by means of a clutch revolved by a turning axle.

By my invention I increase the power of application of the brakes, the space occupied by the brake mechanism is reduced, the attachment of the mechanism to car axles and other structures is made possible without removing the wheels, and the apparatus is rendered operatable from either end of the vehicle. These and other objects will more fully appear from an examination of the following specification and accompanying drawings.

In the drawings, Figure 1 is a plan view of a car truck showing one embodiment of my invention applied thereto. Fig. 2 is a cross section of a portion of the brake applying mechanism taken on the line 2—2 of Fig. 3. Fig. 3 is a longitudinal section of the same taken on the line 3—3 of Fig. 2. Fig. 4 is a detail perspective view of the two cam rings showing them separated. Fig. 5 is an end view of a portion of the brake applying mechanism. Fig. 6 is a longitudinal sectional view of a modification. Fig. 7 is a similar view of another modification; Fig. 8 is a section taken on the line 8—8 of Fig. 7. Fig. 9 is a section, on a reduced scale, on the line 9—9 of Fig. 6. Fig. 10 is a detail view of a modified form of cam ring; and Fig. 11 is a detail section of two such rings.

In all of the views like parts are designated by the same reference characters.

In Fig. 1 the invention is shown as embodied in mechanism for applying brakes to cars by engagement of brake shoes with the peripheries of the wheels, but it is to be understood that the invention may be applied to vehicles other than cars and by the application of braking means in any other manner than by engagement of brake shoes with the peripheries of wheels.

The brake shoes 1 are applied to the peripheries of the wheels 2 in the usual manner by means of the brake beams 3, links 4 and lever 5. The lever 5 is turned upon its axis for the purpose of applying the brake shoes to the wheels by means of a chain or other flexible tension member secured at one end to the lever and connected at the other end to a drum 7. This drum is rotated, in the embodiment illustrated, by means of a clutch 8, such clutch being carried upon the wheel axle 9 and having its elements so arranged as to cause the drum 7 to be rotated with the axle 9 when it is desired to apply the brake, such rotation winding the chain 6 upon the drum and moving the lever 5 upon its axis, moving the brake beams 3 together and applying the brake shoes to the peripheries of the wheels. The clutch 8 has its two parts of which it is composed engaged or disengaged by a mechanism leading in the direction of each end of the car. This mechanism is illustrated in Fig. 1, and comprises the chains or other tension members 10 and 11. Where chains are used, as illustrated, the tension is applied to them by the ordinary brake spindle and applying wheel (not shown) or by any other mechanism.

The details of the clutch and its applying mechanism are shown in Figs. 2, 3, 4 and 5. The clutch comprises a member 12, which rotates with the axle 9 at all times, and a second member 13, which by engagement with the member 12 will rotate with such member and when disengaged therefrom will not rotate. The bearing surfaces are wedge shaped in cross section, as is usual, as shown in Figs. 3 and 6, or they may be flat plane surfaces, as shown in Fig. 7. The engaging surfaces of the male member may be formed of blocks of wood, as is customary. The clutch member 12 is shown as made in two parts connected together by bolts 14 or other suitable fastening so that it may be assembled upon the axle 9 without removal of the wheels 2. The member 12 is caused to rotate with the axle 9 by being secured thereto by keys or other fastenings 15. The body 18 of the member 12 is cylindrical and is provided with flanges 16 and 17. As shown in Fig. 3. the flange 16 carries that portion of the clutch member which constitutes the friction surface. The clutch member 13 turns around the body 18, and may engage directly therewith, but I prefer to interpose a sleeve 19 between the two, the said sleeve turning freely around the body 18, and also supporting the member 13, so that the latter can freely turn around it. The sleeve is provided with a flange 20 at one end, such flange being preferably of the same diameter as the flange 17. The sleeve 19 is formed in two parts, as is the clutch member 12, and for the same purpose. The parts may be connected together by bolts or other fastenings 21 passing through ears 22, as shown in Fig. 6. The clutch member 13 is also formed in two parts, such parts being secured together by bolts or other fastenings 23 (see Fig. 2). The two clutch members are caused to be engaged together by a longitudinal movement of the clutch member 13, which longitudinal movement is secured by the cam rings 24 and 25. These cam rings surround and freely turn upon the sleeve 19, and are located between the flange 20 and a flange 26 carried by the clutch member 13. The point of pivoting of the rings is the center of the axle 9. Preferably the external diameter of the cam rings is the same as the flanges 17, 20 and 26, so this part of the clutch is of uniform diameter, and is free from irregularities of outline, and dust and mud is kept out of the internal portions of the mechanism. The abutting faces of the rings 24 and 25 are provided with a series of cams 27, such series being annular. In the embodiment illustrated there are three cams on each ring. The cams as shown are provided with vertical faces 28 and inclined faces 29. The cams are so arranged that when the two rings 24 and 25 are in engagement one with the other, by rotating one of the rings and holding the other stationary, one set of cams will ride up the inclined faces of the other set of cams and the rings will be separated. If both rings are simultaneously rotated in opposite directions, the same action will occur which will result in the separation of the rings in a longitudinal direction. The ring 24 is caused to engage with the flange 20 and the ring 25 is caused to engage with the flange 26 by rows of balls 30—30, the rings and flanges being formed in the well known manner to constitute ball races. The rings are made in parts, such parts being secured together by bolts 31 or other suitable fastenings so that they may be applied in position or removed without the necessity of the removal of the wheels 2.

For the purpose of relatively rotating the rings, each is provided with an arm 32. As shown in Fig. 2, when the rings are together and in the unseparated position, the clutch parts being out of engagement, each of the arms is back of the center of its point of pivoting. The chains 10 and 11 cross one another and lead in opposite directions. The arms are held in this position by means of springs 33, the abutment of the springs being attached to the car or other fixed part of the truck. The end of the chain 6 is attached to the drum 7, and may be secured to the eye 34, which eye may be located within the groove 7 in the drum.

The operation of so much of my invention is as follows: When the vehicle is running and the brake is not applied, the clutch member 13 will be at rest and the clutch member 12 will rotate. The rings 24 and 25 will also not rotate. These rings and the clutch member engaging with the sleeve 19 and flange 20 will also cause such sleeve to be at rest, so that the rotating part of the clutch and the stationary part of the clutch will be between the sleeve 19 and the body 18. This will relieve the ball bearings from wear and they will be reserved for use only when the clutch is in action. To apply the brake, the chain 10 or 11, or both, is pulled upon, moving one or the other of the arms 33, and moving the cam rings 24 and 25 in relation one to the other. The ring which is not moved will be prevented from turning by the anchoring action of its spring 33. The cams on the stationary ring become abutments for engagement with the cams on the moving ring, and the rings are thereby separated in a direction parallel to the center line of the axle 9, exerting a separating stress between the flanges 20 and 26, and causing the engagement of the clutch member 13 with the clutch member 12. The degree of application of the clutch will depend upon the amount of tension applied to the chains 10 or 11. The clutch member 13 will now rotate and wind up the chain 6 on the drum 7, applying the brake in the manner already described. When the clutch members are engaged the flanges 20 and 30 will be brought together and the increased friction thereby produced will cause the sleeve 19 to turn with the clutch member 12, and as the rings 24 and 25 do not turn, the work will be transferred to the ball bearings, which will transmit the power from the cams to the clutch with the minimum amount of friction. When the brake is released, the slacking up on either of the chains 10 or 11 will cause the springs 33 to move the arms 32 to their normal position, causing the cams 29 to slide down the inclined faces of the opposing cams, and permitting the two rings 24 and 25 to come together, thus releasing the clutch.

In the modification of my invention shown in Fig. 6, the clutch is duplex, it having two male members and two female members. The female member is formed upon flanges 35 of a body 37 which is keyed or otherwise secured to the axle 9, and is divided, as already described, so as to be readily applied to such axle. A sleeve 36 turns loosely upon the body 37 of the clutch member, and carries one male member 38 and a flange 39.

The other male member 40 turns freely upon the sleeve 36 and carries the drum 7. The clutch rings 24 and 25, as in the other form, lie between the sleeve 38 and the clutch member 40. By relatively rotating these rings the sleeve 38 and member 40 are separated, applying the two moving clutch members in engagement with the two stationary clutch members, and causing the rotation of the drum and the application of the brake. The clutch member 40 may carry blocks 41, the clutch member having radiating ribs 43, so that an abutment will be formed for the blocks and they will be prevented from being broken away from their attachment to the member when the clutch is applied.

In the modification shown in Figs. 7 and 8, the same structure is used as in Fig. 6, except that the clutch members have plane surfaces instead of inclined surfaces. The moving clutch members may be in the form of blocks 41, secured to the flanges 39 and 42, such flanges having radiating ribs 43, as already described.

In the modification shown in Figs. 10 and 11, a series of balls 44 is interposed between the cams 27 to reduce friction in applying the clutch. These balls lie in curved grooves or troughs 45, which serve to retain the balls in place between the rings, and to determine their position on the rings.

In accordance with the provisions of the patent statutes, I have described the principle of my invention, together with the apparatus which I now consider to represent the best embodiment thereof, but I desire to have it understood that the apparatus shown is merely illustrative and that the invention can be carried out in other ways.

Having now described my invention, what I claim as new and desire to secure by Letters Patent, is:

1. A vehicle brake mechanism having means for arresting the rotation of a rotary member and means for applying such means, such applying means being actuated by a clutch rotated by the rotating member, the said clutch having two parts which are mutually movable to apply the brake, there being means for mutually moving the clutch parts, such means being in duplicate, and actuated by relative rotary movement, and connections in opposite directions with the latter means for imparting rotary movement to them.

2. A vehicle brake mechanism having a brake shoe and a clutch and connections between the clutch and the brake shoe for applying the latter, the said clutch being formed of two members, one of which rotates with the wheels of the vehicle, and the other is normally at rest and is connected to the brake applying mechanism, there being means for engaging the two clutch parts together, such means comprising two rings having cams which mutually co-act, the cams being so arranged that the rings will be separated by their mutual relative rotation and the clutch parts thereby engaged, and means connected in opposite directions for operating one or both of the rings.

3. A vehicle brake mechanism having a clutch for applying the brake, the said clutch having a portion permanently secured to its supporting axle, a sleeve loosely surrounding such portion and free to turn thereon, a clutch member surrounding the sleeve and free to turn thereon, and a plurality of cam rings surrounding the sleeve and connected thereto and to the clutch member by ball bearings.

4. A vehicle brake mechanism having a clutch for applying the brake, the said clutch being rotated by one of the supporting axles of the vehicle and having a clutch member permanently secured to the axle, the said clutch member being formed in parts, a sleeve loosely surrounding the clutch member and free to turn thereon, the said sleeve being formed in parts, a second clutch member formed in parts and loosely surrounding the sleeve and a plurality of cam rings formed in parts and surrounding the sleeve with ball bearings between one of the rings and the sleeve and between the other ring and the clutch part.

5. A vehicle brake mechanism having a clutch mounted upon one of the axles of the vehicle and connected to the brake, the said clutch comprising a clutch part permanently secured to the axle and a second clutch part mounted thereon but free to turn independently of the axle, and means for applying the two clutch parts together, such means comprising two rings, cams upon the rings, such cams engaging together, and means for relatively moving the rings, whereby the clutch parts are applied together.

6. A vehicle brake mechanism having in combination with the axle, a brake, and brake shoes and clutch connections between the clutch and brake shoes for applying the latter, and means for applying the clutch parts, such means comprising two rings surrounding the axle, the said rings having cams upon their abutting faces, means for independently moving the rings, and means for nominally holding the rings so that the cams are in a disengaged position.

This specification signed and witnessed this fourth day of October, 1907.

ROWLAND FIRTH.

Witnesses:
LEONARD H. DYER,
JOHN S. LOTSCH.